US007100971B2

(12) United States Patent
Pines

(10) Patent No.: US 7,100,971 B2
(45) Date of Patent: Sep. 5, 2006

(54) CARGO BODY WITH RECESSED POSTS

(75) Inventor: Phillip Pines, Highland Park, IL (US)

(73) Assignee: Great Dane Limited Partnership, Chicago, IL (US)

( * ) Notice: Subject to any disclaimer, the term of this patent is extended or adjusted under 35 U.S.C. 154(b) by 30 days.

(21) Appl. No.: 10/943,326

(22) Filed: Sep. 17, 2004

(65) Prior Publication Data

US 2006/0061136 A1    Mar. 23, 2006

(51) Int. Cl.
*B62D 25/02*    (2006.01)
(52) U.S. Cl. .................. 296/186.1; 296/191; 296/29
(58) Field of Classification Search ............ 296/186.1, 296/182.1, 191, 199, 203.03, 29
See application file for complete search history.

(56) References Cited

U.S. PATENT DOCUMENTS

| | | | | |
|---|---|---|---|---|
| 3,393,920 A | 7/1968 | Ehrlich | ....................... | 280/106 |
| 3,692,349 A | 9/1972 | Ehrlich | ......................... | 296/28 |
| 3,815,500 A | 6/1974 | Glassmeyer | ................ | 105/369 |
| 4,065,168 A | 12/1977 | Gregg | ........................... | 296/28 |
| 4,212,405 A | 7/1980 | Schmidt | ..................... | 220/1.5 |
| 4,420,183 A | 12/1983 | Sherman | ..................... | 296/181 |
| 4,437,699 A | 3/1984 | Lewis et al. | ................ | 296/181 |
| 4,498,264 A | 2/1985 | McCafferty et al. | .......... | 52/281 |
| 4,592,585 A | 6/1986 | Oren et al. | .................. | 296/181 |
| 4,810,027 A | 3/1989 | Ehrlich | ........................ | 296/181 |
| 5,058,756 A | 10/1991 | Green | ......................... | 220/1.5 |
| 5,195,800 A | 3/1993 | Stafford et al. | ............. | 296/181 |
| 5,348,176 A | 9/1994 | Yurgevich et al. | .......... | 220/1.5 |
| 5,433,501 A | 7/1995 | Thomas et al. | ............. | 296/191 |
| 5,507,405 A | 4/1996 | Thomas et al. | ............. | 220/1.5 |
| 5,509,714 A | 4/1996 | Schmidt | ..................... | 296/181 |
| 5,584,252 A | 12/1996 | Smith et al. | ................ | 105/409 |
| 5,584,527 A | 12/1996 | Sitter | ......................... | 296/181 |
| 5,700,118 A | 12/1997 | Bennett et al. | ............. | 410/113 |
| 5,860,693 A | 1/1999 | Ehrlich | ....................... | 296/191 |
| 5,876,089 A * | 3/1999 | Ehrlich | ....................... | 296/186.1 |
| 5,934,849 A | 8/1999 | Haire | ......................... | 410/113 |
| 5,984,401 A * | 11/1999 | Hannah | ................. | 296/136.01 |
| 5,992,117 A | 11/1999 | Schmidt | .................... | 52/582.1 |
| 5,997,076 A * | 12/1999 | Ehrlich | ........................ | 296/191 |
| 6,003,932 A | 12/1999 | Banerjea et al. | ............ | 296/181 |
| 6,010,020 A | 1/2000 | Abal | ......................... | 220/1.5 |
| 6,220,651 B1 | 4/2001 | Ehrlich | ........................ | 296/181 |
| 6,412,854 B1 | 7/2002 | Ehrlich | ........................ | 296/191 |
| 6,422,156 B1 | 7/2002 | Winsor et al. | ............. | 105/355 |
| 6,497,451 B1 | 12/2002 | Jones et al. | .............. | 296/186.1 |
| 6,607,237 B1 | 8/2003 | Graaff et al. | ............... | 296/181 |

(Continued)

FOREIGN PATENT DOCUMENTS

| | | | | |
|---|---|---|---|---|
| CA | 2332565 | 1/2001 | ...................... | 33/4 |
| CA | 2403743 | 12/2004 | ...................... | 33/4 |

OTHER PUBLICATIONS

Wabash National Parts Document, entitled "Body Parts.".
Trailer Component Drawings, Figures 1-4B.

*Primary Examiner*—H Gutman
(74) *Attorney, Agent, or Firm*—Nelson Mullins Riley & Scarborough, LLP

(57) ABSTRACT

A cargo body for transport by a cargo vehicle includes a floor, side walls and optionally a roof wall, where at least one wall has a plurality of elongated posts. The posts attach an outer skin to inner wall panels. The front face of each elongated post has a recessed trough opening to a cargo area defined by the walls and the floor.

49 Claims, 11 Drawing Sheets

U.S. PATENT DOCUMENTS

| | | | |
|---|---|---|---|
| 6,626,622 B1 | 9/2003 | Zubko | 410/113 |
| 6,652,018 B1 | 11/2003 | Buchholz et al. | 296/191 |
| 6,682,127 B1 | 1/2004 | Jones et al. | 296/187.03 |
| 6,832,808 B1 | 12/2004 | Bennett | 296/186.1 |
| 6,866,330 B1 | 3/2005 | Jones et al. | 296/186.1 |
| 6,923,493 B1 | 8/2005 | Buchholz et al. | 296/186.1 |
| 2001/0024055 A1* | 9/2001 | Ehrlich | 296/191 |
| 2002/0098053 A1 | 7/2002 | Zubko | 410/115 |
| 2002/0109377 A1* | 8/2002 | Ehrlich | 296/191 |
| 2003/0071486 A1 | 4/2003 | Graaff et al. | 296/181 |
| 2005/0242621 A1* | 11/2005 | Buchholz et al. | 296/186.1 |

* cited by examiner

CARGO BODY WITH RECESSED POSTS

BACKGROUND OF THE INVENTION

The present invention relates generally to cargo bodies and, more particularly, to cargo bodies with vertical posts in their side walls.

A wide variety of conveyances are known for carrying cargo. Van-type semi trailers, for example, typically include a deck assembly supported by a side wall structure, wheels and front legs. The deck assembly may include longitudinal floor boards and transverse cross-members, such as I-beams, extending between opposing bottom rails. The deck transfers its load to the bottom rails, wheels and, depending upon whether the trailer is coupled to a tractor or is free-standing, to a tractor fifth wheel or to retractable front legs on the trailer. The side wall structure of a van-type trailer also supports some of the load, much in the same way that the trusses of a bridge support the load of a roadway. This allows for the floor to be somewhat lighter, resulting in a reduction in the trailer's overall weight.

In a monocoque-type trailer, individual interior side wall panel members and an outer wall are joined together, often by a post, channel or zee-shaped structural member, and to a suspension subframe to form a self-supporting body construction. The outer wall and inner panel members may carry some of the stresses between the posts, floor and roof of the trailer. For example, it is known for the interior panels and the outer wall to attach to a plurality of vertical posts spaced apart along the trailer side wall. It is known to place logistics tracks on the front faces of the vertical posts to provide a place of attachment for straps, hooks and bars to secure cargo in the cargo area between the side walls. In the roof wall of such a trailer, it is known to provide a top outer skin that extends between, and is riveted to, opposing side wall top rails. A plurality of parallel, horizontal roofbows extend between the top rails beneath the top outer skin. It is known to provide inner liner panels, for example one-quarter inch plywood sheets, between the roofbows so that the roof liner panels define the top of the cargo area. Logistics tracks have been attached to the roofbows. Where inner liner panels are present in the roof wall, the logistics tracks have been attached directly to respective roofbows between edges of adjacent liner panels or surface mounted to the liner panels themselves.

A container is a box-like structure with sidewalls, a floor, a roof, a forward end wall and an end frame on which two doors are pivotally attached. The container rests on a chassis formed by one or more longitudinal I-beams extending between retractable legs and a plurality of axled wheels. The wheels support the container's rearward end and facilitate the container's movement when the container (supported by the chassis) is coupled to a tractor. As should be well understood, the container is removable from the chassis for conveyance by other means, such as ship or rail.

SUMMARY

The present invention recognizes and addresses considerations of prior art constructions and methods.

In an embodiment of the present invention, a cargo body for transport by a cargo vehicle includes a floor and two side walls extending upward from respective lateral sides of the floor so that a cargo area is defined between the side walls. Each side wall is further comprised of an outer wall, a plurality of inner wall panels facing the cargo area, and a plurality of elongated vertical posts disposed between and attached to the outer wall and inner wall panels. Each elongated vertical post has a front surface facing the cargo area between adjacent inner wall panels attached to the vertical post and has an elongated vertical trough recessed in the front surface and opening to the cargo area.

Each side wall may further comprise a plurality of logistics tracks, each received within a respective elongated vertical trough. In addition, the front surface of each logistics track may be substantially coplanar with surfaces of the inner wall panels facing the cargo area. Optionally, each elongated vertical post may have a portion proximate the floor that is recessed away from the cargo area that receives a horizontal scuff band.

In another preferred embodiment of the present invention, a cargo body for transport by a cargo vehicle includes a floor, two sidewalls extending upward from respective lateral sides of the floor, and a roof wall that extends between the sidewalls and opposing the floor so that a cargo area is bounded by the floor, the sidewalls and the roof wall. At least one of the sidewalls and the roof wall further comprises an outer wall surface, a plurality of inner wall panels facing the cargo area, and a plurality of a elongated posts disposed between and attached to the outer wall surface and the inner wall panels. Each elongated post has a front surface facing the cargo area between adjacent inner wall panels attached to the post and has an elongated trough extending lengthwise along, and recessed in, the front surface and opening to the cargo area.

A method according to another embodiment of the present invention for increasing volume of a cargo area within a cargo body for transport by a cargo vehicle, where the cargo body includes a longitudinal member disposed on a wall facing the cargo area, includes providing a floor, providing two side walls extending upward from respective lateral sides of the floor, and providing a roof wall extending between the side walls and opposing the floor so that the cargo area is bounded by the floor, the side walls and the roof wall. At least one of the side walls and the roof wall further comprises an outer wall surface, a plurality of inner wall panels facing the cargo area, and a plurality of elongated posts disposed between and attached to the outer wall surface and the inner wall panels. Each elongated post has a front surface facing the cargo area between adjacent inner wall panels attached to the post. In at least one of the posts, an elongated trough is defined extending lengthwise along, and recessed in, the front surface and opening to the cargo area. The longitudinal member is disposed in the elongated trough.

The accompanying drawings, incorporated in and constituting part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
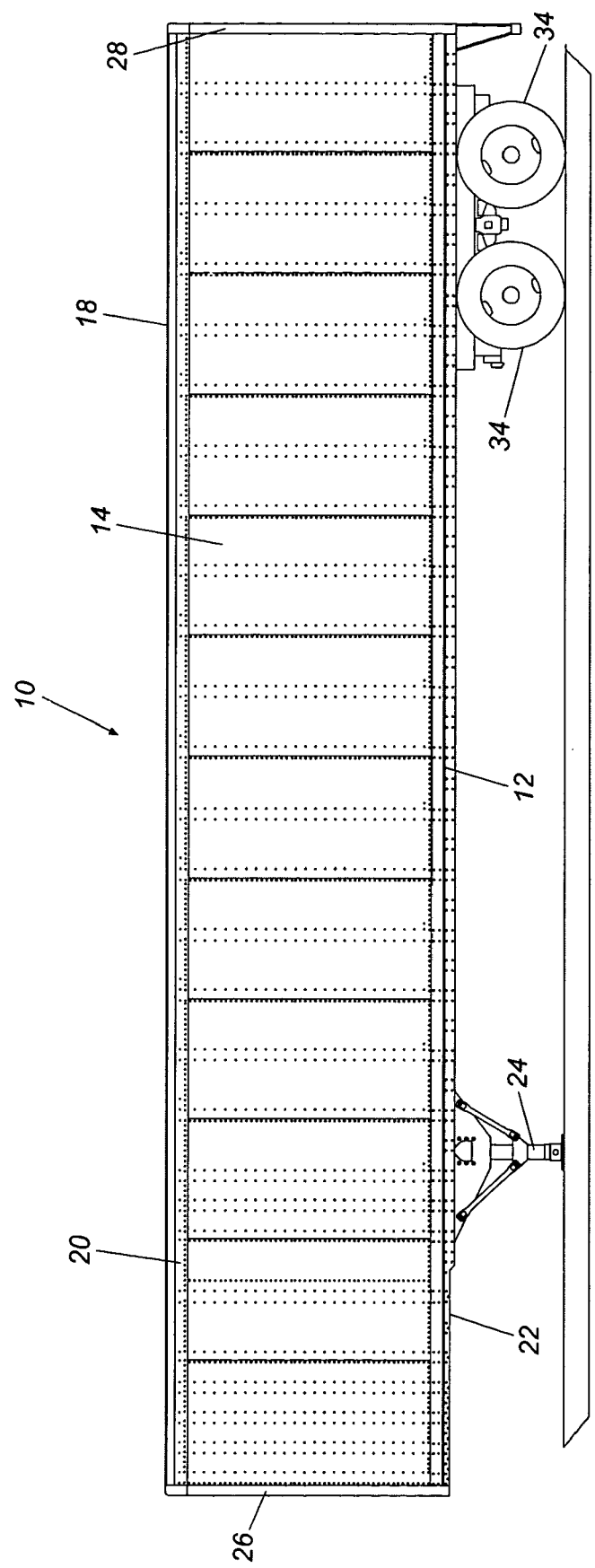
FIG. 1 is a side view of a cargo trailer in accordance with an embodiment of the present invention.
Figure 1A:
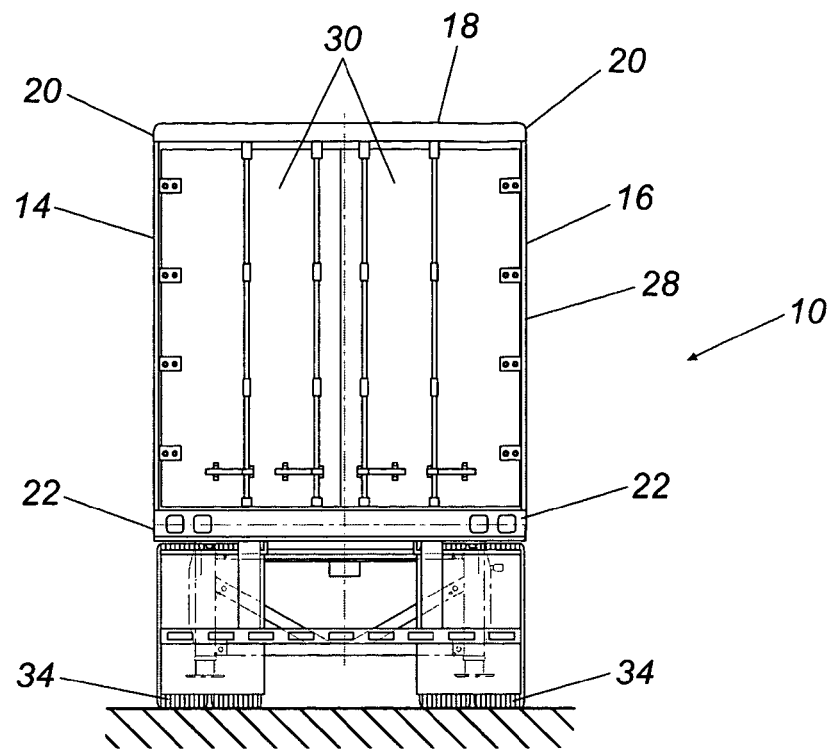
FIG. 1A is a rear view of a cargo trailer as in FIG. 1.
Figure 1B:
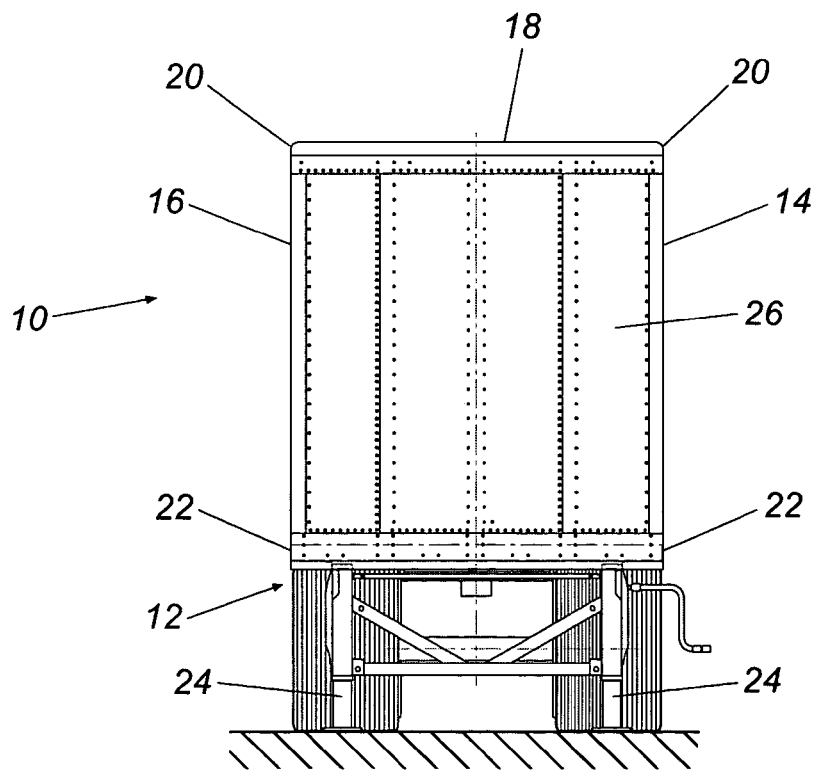
FIG. 1B is a front view of a cargo trailer as in FIG. 1.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIGS. 1, 1A, 1B and 1C illustrate a cargo trailer 10 having a cargo body with a floor 12, two identically constructed side walls 14 and 16 on opposite lateral sides of the floor, and a roof wall 18. The side walls include two elongated top rails 20 that extend along tops of side walls 14 and 16, respectively, and attach roof wall 18 to the side walls, as well as two elongated bottom rails 22 that extend along the side wall bottom edges and connect floor 12 to the side walls. The top and bottom rails may be formed of extruded aluminum or other metal or suitable material. The distance between opposing inner surfaces of side walls 14 and 16 generally is greater than ninety inches, and the distance between outer surfaces of the opposing side walls is generally less than 110 inches.

Figure 8:
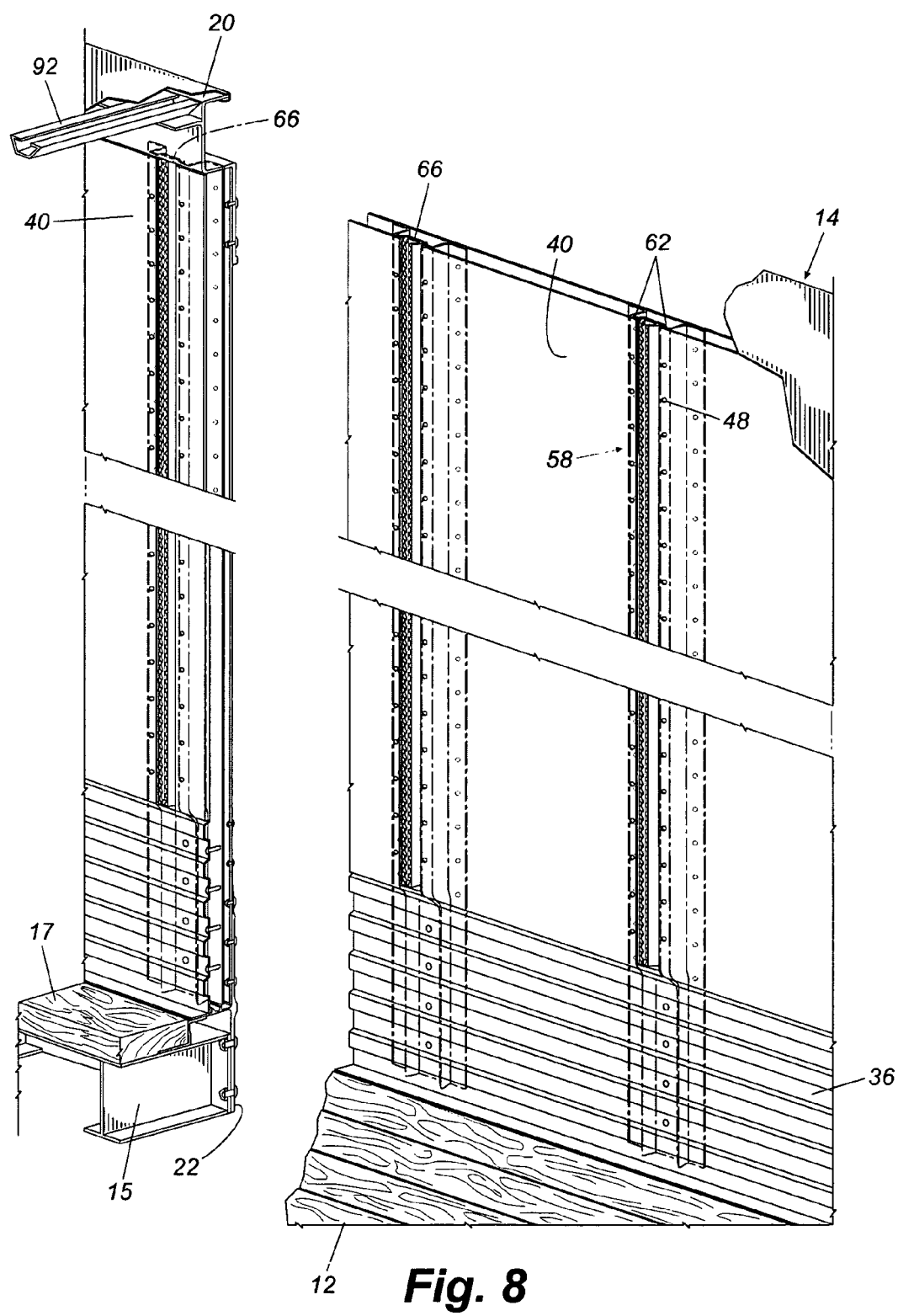
FIG. 8 is a cut-away perspective interior view of a cargo trailer in accordance with an embodiment of the present invention.

The trailer includes a forward end wall 26 and a rearward end frame 28. Two doors 30 at the trailer's rearward end are pivotally connected to rear end frame 28, although it should be understood that a roll-type door could also be used. The assembled trailer's side walls, forward wall, rear doors and roof wall define an interior cargo area. Referring also to FIG. 8, floor 12 may be formed by wood floor boards 17 or other suitable material attached to I-beam shaped cross-members 15 extending transversely between the opposing bottom rails 22. The floor is supported at the rear by a wheel assembly comprising typically up to eight axled wheels 34 and at the front by retractable legs 24. The wheels support the trailer's rearward end and facilitate the trailer's movement when the trailer is coupled to a diesel semi tractor (not shown).

Figure 1C:
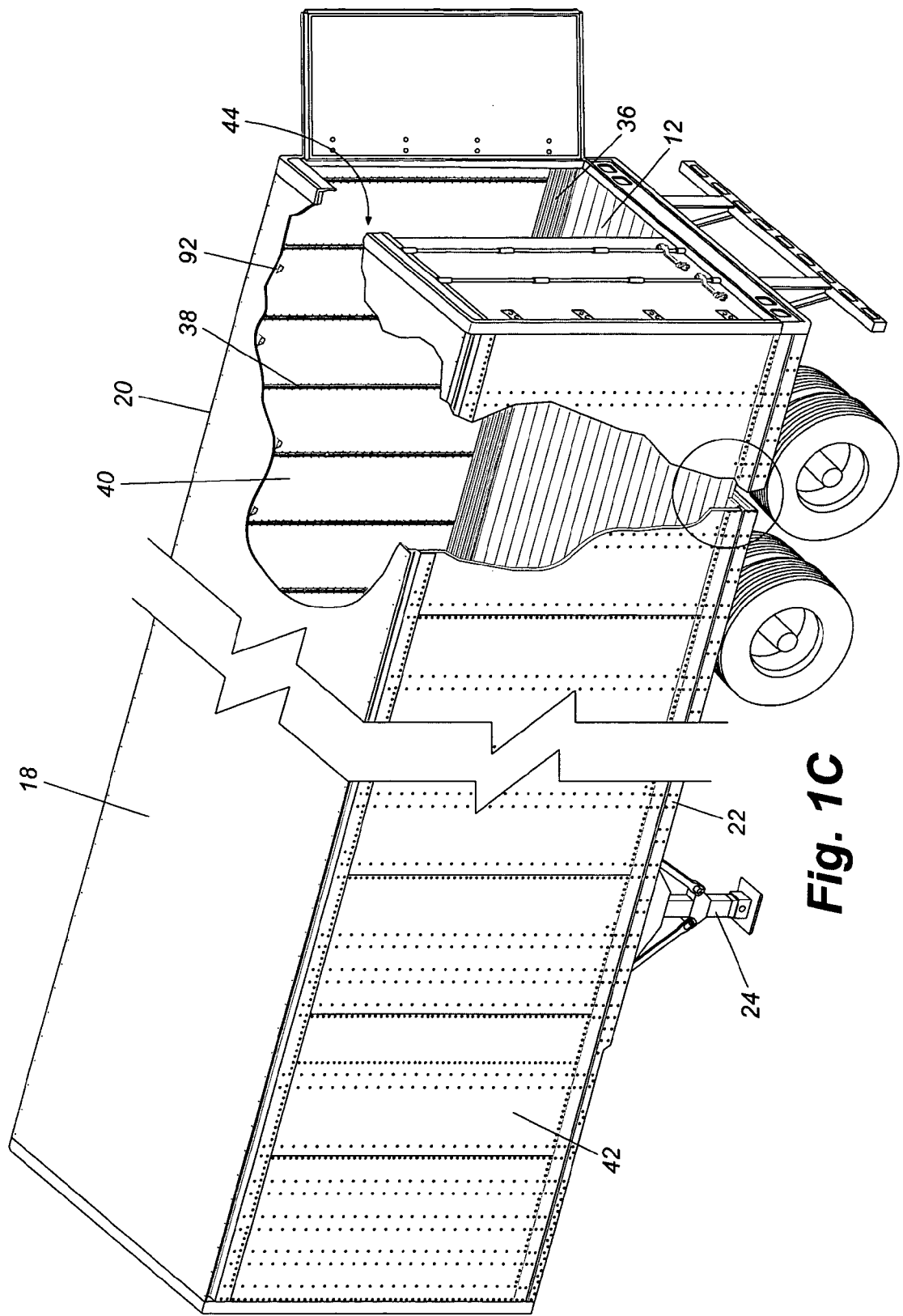
FIG. 1C is a perspective view of a cargo trailer as in FIG. 1.

Referring particularly to FIG. 1C, a plurality of elongated vertical posts 38 attach to and extend between top rail 20 and bottom rail 22. Inner wall panels 40 attach to and extend between adjacent vertical posts on the posts' front sides, while an outer skin 42 of each side wall attaches to the posts' rear surfaces and faces the trailer's exterior. Inner wall panels 40, floor 12, and roof wall 18 define a cargo area 44. The outer skin is preferably formed of aluminum but could also be formed of plastic, stainless steel, metal alloy, fiberglass, or any other tough material. "Toughness" refers to the ability of a material to rapidly distribute within itself both the stress and strain caused by a suddenly applied load, or more simply expressed, the ability of a material to withstand shock loading. "Tough" is the opposite of "brittle," which carries the implication of sudden failure. A brittle material has little resistance to failure once the material's elastic limit has been reached. The inner wall is preferably formed of plywood but also could be formed of fiber reinforced plastic, polymer, laminates or other suitable materials. The outer skin (in one preferred embodiment, a plurality of generally rectangular nominal 0.050" aluminum sheets) is fastened to the vehicle's top rail 20 and bottom rail 22. Inner wall panels 40 may or may not connect to the top and bottom rails.

While the present vertical post construction is described herein in the context of a van-type trailer, it should be understood that this is for exemplary purposes only and that such construction could be utilized, for example, in the walls of containers, truck bodies or other walled cargo or freight carrying enclosures transported by wheeled or other conveyances, such walled enclosures being generally referred to herein as "cargo bodies." A "cargo vehicle" is a wheeled conveyance, such as a van-type trailer or a container trailer chassis, that includes or otherwise transports a cargo body.

Figure 1D:
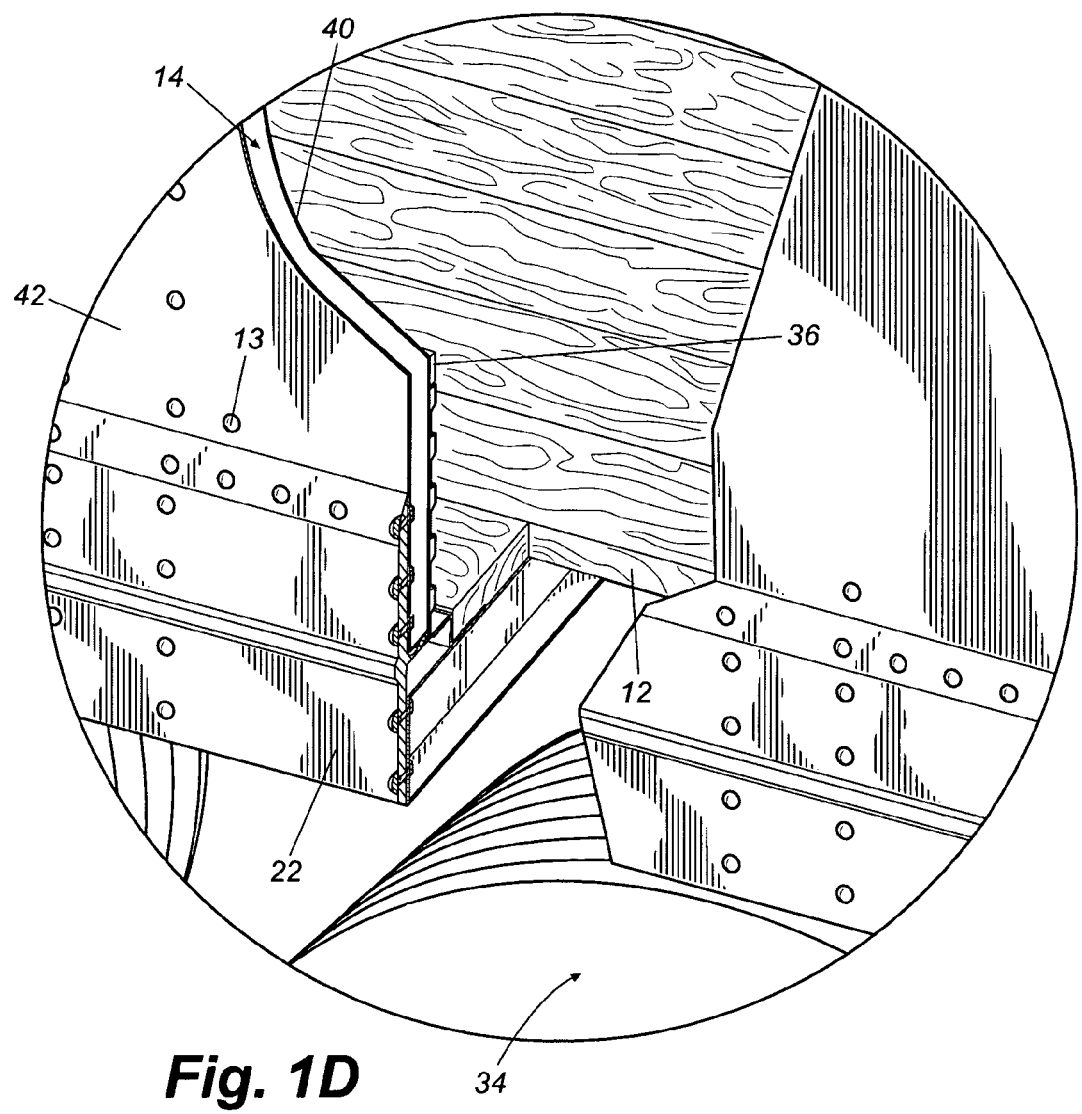
FIG. 1D is a cut-away view of the side wall and floor of a cargo trailer as in FIG. 1.

Referring also to FIG. 1D, inner wall panels 40 and outer skin 42 are connected by the elongated vertical posts (not shown) and rivets. It should be understood by those skilled in the art, however, that screws or other suitable alternatives to rivets could be used to connect the inner wall panels and outer wall to the vertical posts. Outer skin 42, which can be formed as a single sheet or in sections, connects to bottom rail 22 by rivets 13 or other suitable means. Wheel assembly 34 supports floor 12. A scuff band 36 covers the bottom portion of the trailer's interior side wall.

Figure 2:
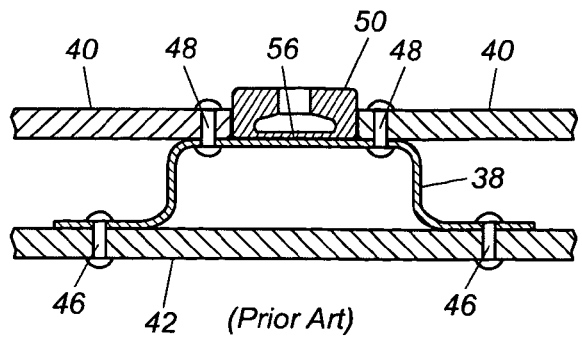
FIG. 2 is a top cut-away view of a prior art elongated vertical post and logistics track.

FIG. 2 illustrates a prior art elongated vertical post 38 used in trailers such as shown in FIGS. 1–1D between inner wall panels 40 and outer skin 42. Rivets 46 and 48 attach the inner wall panels and outer skin to the elongated vertical post. A logistics track 50 is attached to a front surface 56 of elongated vertical post 38 by screws, welding or other suitable means. Logistics tracks, such as those available from Ancra, LLC of Erlanger, Ky., are used to restrain cargo within a cargo vehicle (FIGS. 7C and 7D provide perspective views of prior art logistics tracks). These tracks generally comprise an elongated structure with slots, holes, sockets, hooks or other attachment points in the surface of the track facing the cargo area. Hooks, latches, or other suitable hardware attach to the attachment points, and bars, straps, ropes, cargo nets, or other restraining devices connected to the attachment hardware prevent cargo within the trailer from shifting during transit. Logistics track 50 preferably is formed of aluminum but may be made from steel, reinforced polymer or another suitable material. The logistics track in FIGS. 2 and 4 is shaped differently than the logistics track of FIGS. 3 and 5, and it should be understood that these and other suitable logistics track configurations could be used.

Figure 3:
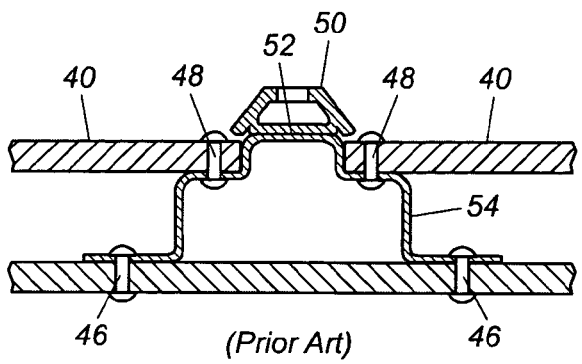
FIG. 3 is a top cut-away view of a prior art elongated vertical post and logistics track.

In the prior art construction illustrated in FIG. 3, an elongated vertical post 54 has an elevated front surface 52 such that, absent the presence of a logistics track, inner wall panels 40 and vertical post 54 form a substantially planar surface. Logistics track 50 attaches to vertical post front surface 52 by screws, welds or other suitable means. As in FIG. 2, rivets 46 and 48 connect outer skin 42 and inner wall panels 40, respectively, to vertical post 54.

Referring now to FIG. 8, a cargo vehicle, in this instance a van-type semi trailer, is constructed as discussed above with respect to FIGS. 1A–1C. More specifically, the trailer includes a plurality of elongated vertical posts 58 as discussed in more detail below with respect to FIGS. 4, 5, 6A, 6B, 7A and 7B. Each post 58 is connected to top rail 20 and to bottom rail 22 by suitable means such as rivets, screws or the like, as discussed above. Inner wall panels 40 are secured to the top and bottom rails through their connection to the posts by rivets 48 but may also be directly connected to the top and bottom rails at the panels' top and bottom edges.

Figure 4:
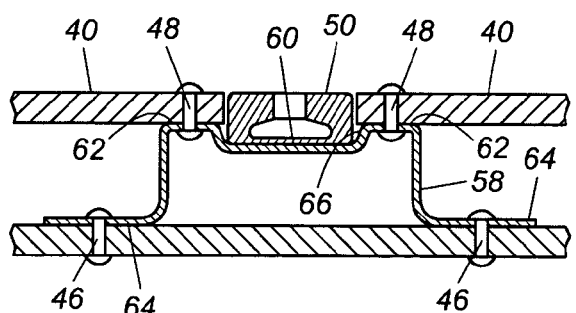
FIG. 4 is a top cut-away view of an elongated vertical post and logistics track in accordance with an embodiment of the present invention.

Referring also to FIG. 4, each post 58 defines a vertically aligned trough 66 in a front surface 60 of the post facing the cargo area between the side walls. A respective logistics track 50 is received in each trough 66 and may extend from top rail 20 to scuff band 36 adjacent the trailer floor. As discussed below, scuff band 36 fits into a recessed portion of post 58 near floor 12 (see FIGS. 1C and 8). Scuff band 36 preferably is between one and two feet high, although different heights may be appropriate in certain applications. The scuff band preferably is formed of corrugated metal, plywood, hardwood, reinforced polymer or other suitable materials.

Referring to FIGS. 4, 6A, 6B and 8, inner wall panels 40 are riveted to post front face 60 at shoulders 62 at either side of vertical trough 66. Outer skin 42 attaches to post rear flanges 64 by rivets 46. It should be understood, however, that the inner panels and outer skin may be attached to the vertical posts in other suitable manners, such as by adhesives or screws. Logistics track 50 attaches to front surface 60 within vertical trough 66 by rivets, screws, adhesive, pressure fit or other suitable means. The front surface of logistics track 50 (i.e. the surface facing the cargo area between the sidewalls) is substantially flush with the front surfaces of liner panels 40, and logistics track 50 and inner panels 40 thereby form a substantially planar inside side wall surface. In other alternative embodiments, the front surface is not flush with the liner panel surfaces, and the logistics track protrudes into the cargo area. However, because trough 66 receives the logistics track, the track does not extend into the cargo area to the extent it would if trough 66 were not present and front surface 60 extended evenly across its width flush with shoulders 62 (as in FIG. 2).

The cargo area's effective width is limited by the greatest width of rigid cargo that can be placed into a given part of the cargo area. Thus, depending on the cargo, the cargo area's useful width can be limited by the logistics track-to-logistics track dimension rather than the dimension between opposing inner wall panels. Trough 66, in providing for a recessed logistics track, both provides a smoother side wall inner surface (thereby reducing the likelihood that cargo will impact the track during loading and unloading) and increases available cargo space volume in the trailer's cargo area. Furthermore, where trough 66 is dimensioned so that the side edges of the logistics track abut or otherwise support the side walls of the trough, the logistics track transfers shear loads to the vertical post through the abutting surfaces, thereby reducing the number of fasteners required to secure the logistics track to the post.

Figure 6A:
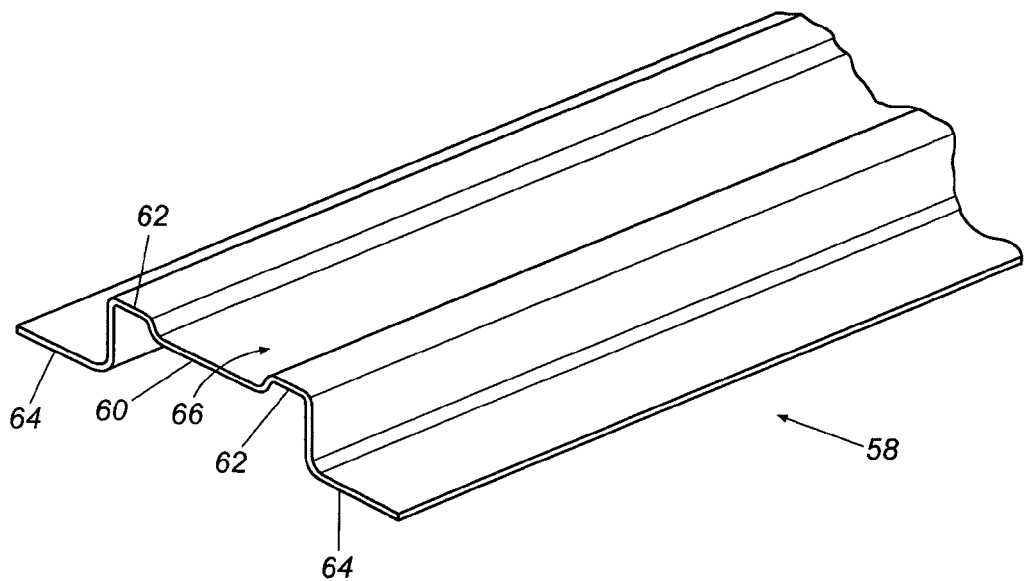
FIG. 6A is a partial perspective view of an elongated vertical post as in FIG. 4.
Figure 6B:
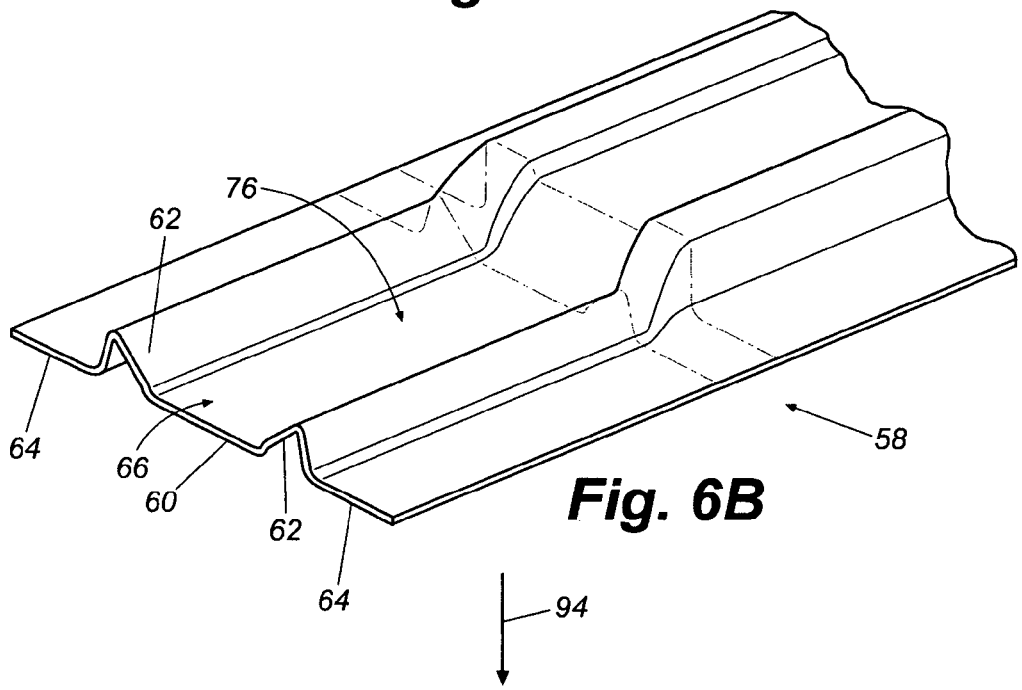
FIG. 6B is a partial perspective view of an elongated vertical post as in FIG. 4.
Figure 6C:
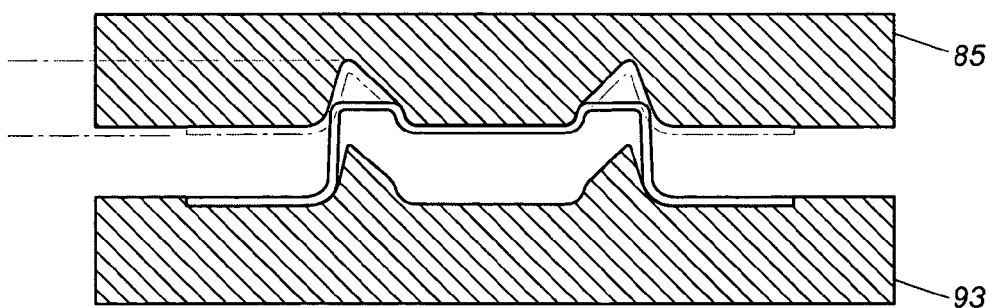
FIG. 6C is a side view of a die assembly with an elongated vertical post.

Referring also to FIGS. 6A–6C, a portion 76 of each vertical post 58 proximate the cargo trailer's floor is recessed away from the trailer's cargo area to allow placement of scuff band 36 along the bottom of the side wall's interior. The scuff band provides protection to the bottom of the side wall's interior, an area that frequently receives abuse during the loading and unloading of cargo from the cargo trailer. In a preferred embodiment, post 58 is recessed about a quarter of an inch, although deeper or shallower recessions may be appropriate to accept different sized scuff bands. This recession does not expand the overall width of post 58.

An upper die 85 and lower die 93 shown in FIG. 6C are used to create recessed portion 76 in a vertical post. Before the post's placement between dies 85 and 93, its cross-section is substantially consistent along its entire length, as shown in FIG. 6A. To form the recessed portion, and referring to FIG. 6C, the lower portion of post 58 is disposed between upper die 85 and lower die 93. Upper die 85 may be forced toward lower die 93, or lower die 93 may be forced toward upper die 85, thereby deforming the post's lower end as shown in FIG. 6B. It should be understood that the post shapes may vary, and differing die configurations may therefore be used as appropriate. Preferably, however, the post's stamped lower end defines a flat front surface and an accordion flange structure between the front surface and the post's side edges. The die maintains the position of the side edges so that the accordion collapses as the die pushes in the selected portion of the front face. Accordingly, the post maintains a constant width while recessed portion 76 provides a surface for receipt of scuff band 36.

The vertical posts are preferably made from steel because of the material's high strength, stiffness and comparatively low cost, although it should be understood that aluminum, other metals, polymers or other suitable materials could be used. Prior to stamping the recess for the scuff band, the vertical post is roll-formed from a flat steel sheet to its shape as in FIG. 6A. As should be understood, a metal sheet in a roll forming process is passed through a series of roller dies that progressively form the metal into the required profile or shape. In one preferred embodiment, vertical trough 66 is 0.28 inches deep and 1.625 inches wide at its greatest width. The trough sides angle down slightly to a minimum trough width of 1.38 inches. Alternatively, vertical trough 66 could be formed by stamping or through use of progressive dies. For example, while trough 66 is illustrated in the Figures as extending along the entire length of the vertical post, the trough may alternately extend over only a partial length of the vertical post or may be defined as discrete segments occurring intermittently along the post. In such embodiments, the post is preferably first roll formed to a shape without the trough, and the trough is thereafter stamped into the post's front surface. Even where the trough extends over the post's entire length, the trough may be stamped if desired.

Figure 5:
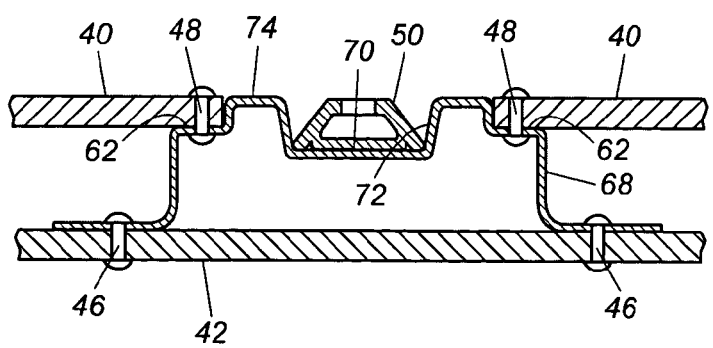
FIG. 5 is a top cut-away view of an elongated vertical post and logistics track in accordance with an embodiment of the present invention.
Figure 7A:
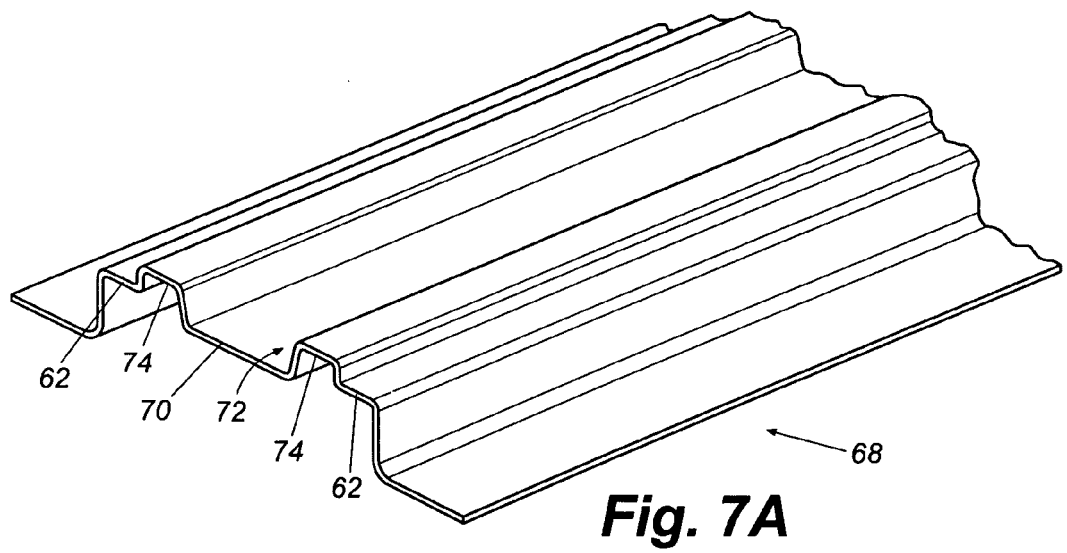
FIG. 7A is a partial perspective view of an elongated vertical post as in FIG. 5.
Figure 7B:
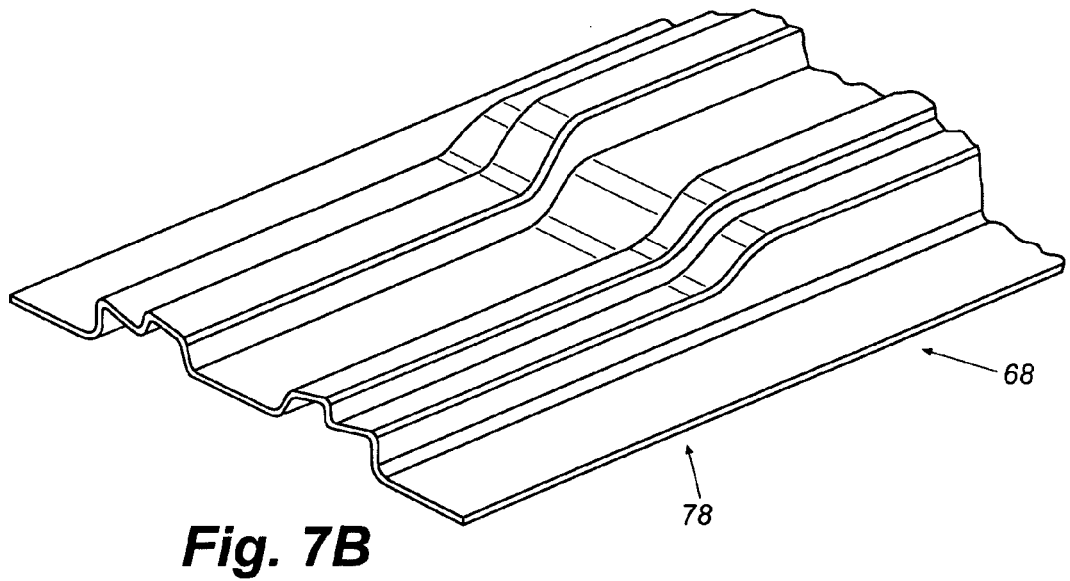
FIG. 7B is a partial perspective view of an elongated vertical post as in FIG. 5.
Figure 7C:
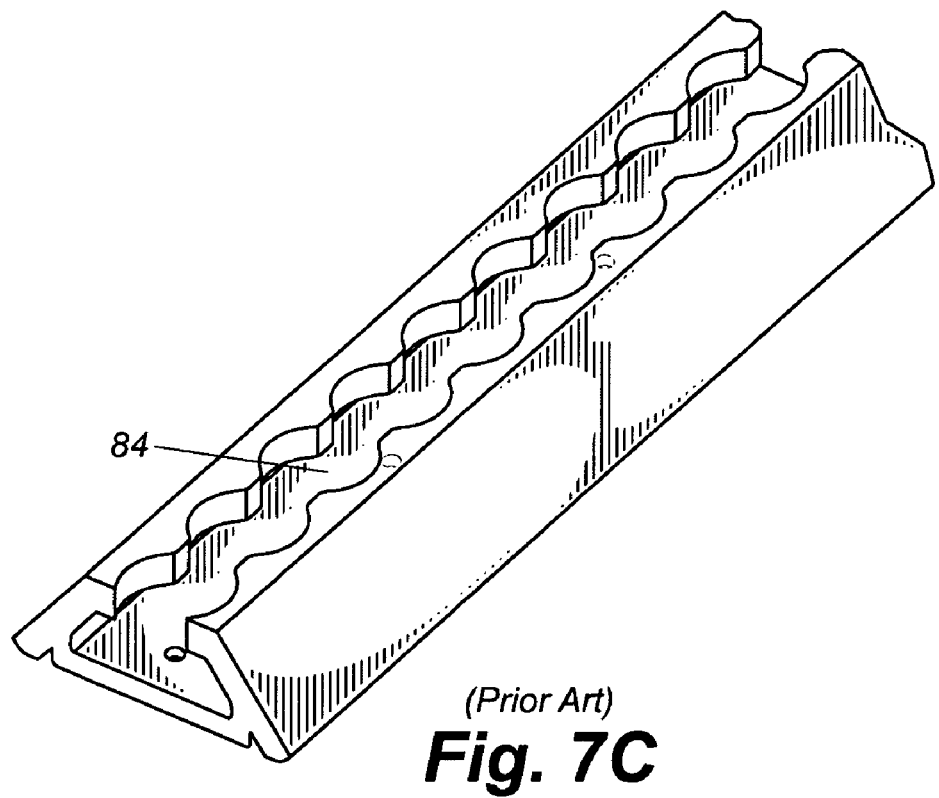
FIG. 7C is a perspective view of a logistics track.
Figure 7D:
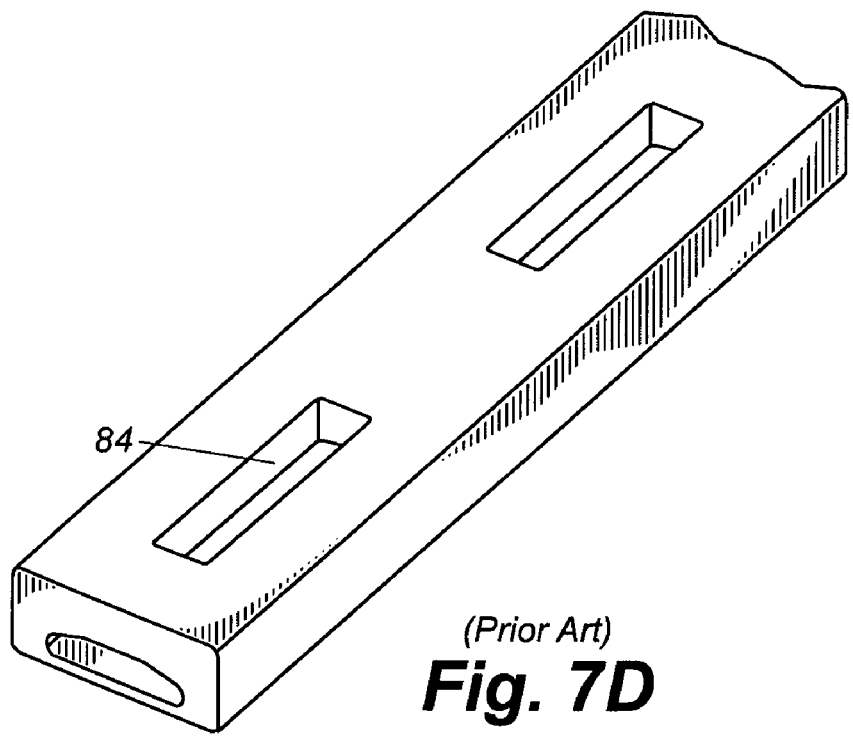
FIG. 7D is a perspective view of a logistics track.

In an alternative embodiment illustrated in FIGS. 5, 7A and 7B, elongated vertical post 68 maintains its substantially hat-shaped profile and defines a vertical trough 72 in its front surface 70 flanked by a shoulder 62 on respective sides of the trough at which the liner panels 40 are attached. Between trough 72 and each shoulder 62 is a raised shoulder 74. The front surface of logistics track 50 is substantially flush with the front surfaces of liner panels 40 and shoulders 74 so that inner wall panels 40, shoulders 74 and the front face of logistics tracks 50 form a substantially planar inside side wall surface. In FIG. 5, as with the embodiment shown in FIG. 4, the depth of the trough is approximately equal to the front-to-back width of the logistics track. However, the depth of the trough may be less than the logistic track's width, so that a portion of logistics track 50 protrudes into the cargo area. As noted above, the trough may be dimensioned so that the sides of a logistics track received therein abut the trough side walls, thereby allowing the transfer of shear loads through the abutting or otherwise contacting surfaces.

In FIG. 7B, recessed portion 78 recesses away from the cargo area to accept a scuff band while maintaining a substantially planar inner wall surface. The received portion may be formed between appropriately—shaped dies similarly to the process discussed above with respect to FIG. 6B and 6C.

Referring to FIGS. 7C and 7D, a logistics track may have any cross-section suitable for attachment to the elongated vertical post. The tracks may be formed of steel, aluminum, rigid polymer, or any other material capable of withstanding the loads exerted on attachment points 84 during use. As should be understood by those skilled in the art, different configurations of attachment points may be used. For example, the logistics track might have discrete slots or integrated hooks or loops to allow the direct attachment of S-hooks or straps to the track. Moreover, the logistics track need not extend the entire length of the post or may be attached to the post in separate, discrete sections. Such smaller or segmented tracks may be disposed in desired positions in a trough extending the entire vertical length of the post. Alternatively, however, troughs receiving such tracks may be defined over partial or intermittent areas of the post, as noted above. In addition to logistics tracks, which are elongated members with multiple attachment points, other logistics devices with single attachment points, such as holes, slots, sockets or hooks, or other devices or elongated members may be disposed in the trough.

In preferred embodiments, roof wall 18 (FIG. 1C) may be constructed with horizontal posts and an outer skin, with or without inner liner panels. Referring to FIG. 8, for example, a plurality of elongated horizontal posts, or roofbows, 92 extend between opposing top rails 20 on either side of the trailer. There are no inner wall panels in this embodiment, and the roofbows' front sides face the cargo area. An outer skin attached to the roofbows' rear surfaces is preferably formed of aluminum but could also be formed of plastic, stainless steel, metal alloy, fiberglass or other tough material. The outer skin (in one preferred embodiment, a nominal 0.040" aluminum skin) is fastened to the opposing top rails. Inner wall panels, for example 0.25" plywood sheets (not shown), may be attached to the roofbows' front surfaces so that the panels define the top of the cargo area. The inner wall panels extend between, but may or may not attach to, the opposing top rails. Logistics tracks may be attached to and along the roofbows' front surfaces between respective pairs of adjacent liner panels or, where adjacent panels abut each other and thereby cover the roofbows' front surfaces, to the liner panels by rivets that extend through the panels and into the roofbows. Attachments between the inner wall panels and the top rails, between the inner wall panels and the horizontal posts, between the outer skin and the horizontal posts, between the outer skin and the top rails, between horizontal posts and the top rails, and between the logistics tracks and the roofbows may be effected by rivets, adhesive or other suitable means.

In another preferred embodiment, the roof wall and the horizontal posts are formed in the same manner as the side wall and side wall vertical posts described above and as shown in FIGS. 4, 5, 6A and 7A. Thus, FIGS. 4 and 5 are similar to the cross section of the roof wall, where the horizontal roolbows are constructed in the same manner as are posts 58 and are disposed between inner wall panels 40 facing the cargo area and outer skin 42 forming vehicle's top exterior surface. Longitudinal members, such as logistics tracks 50, or other devices may be received in (horizontal) troughs 66 and 72 extending lengthwise along the posts' front surfaces. As with the side wall posts, the recessed roof wall posts provide a smoother wall inner surface and increase the available cargo space in the trailer's cargo area. The roof wall generally does not include a scuff band, and the horizontal posts are therefore preferably not depressed as in FIGS. 6B and 7B, although such constructions can be used if desired. Furthermore, the roof outer skin is preferably formed of a single sheet to avoid seams, and the outer skin preferably attaches to the roofbows by adhesive rather than rivets to avoid holes.

Figures 9, 9A:
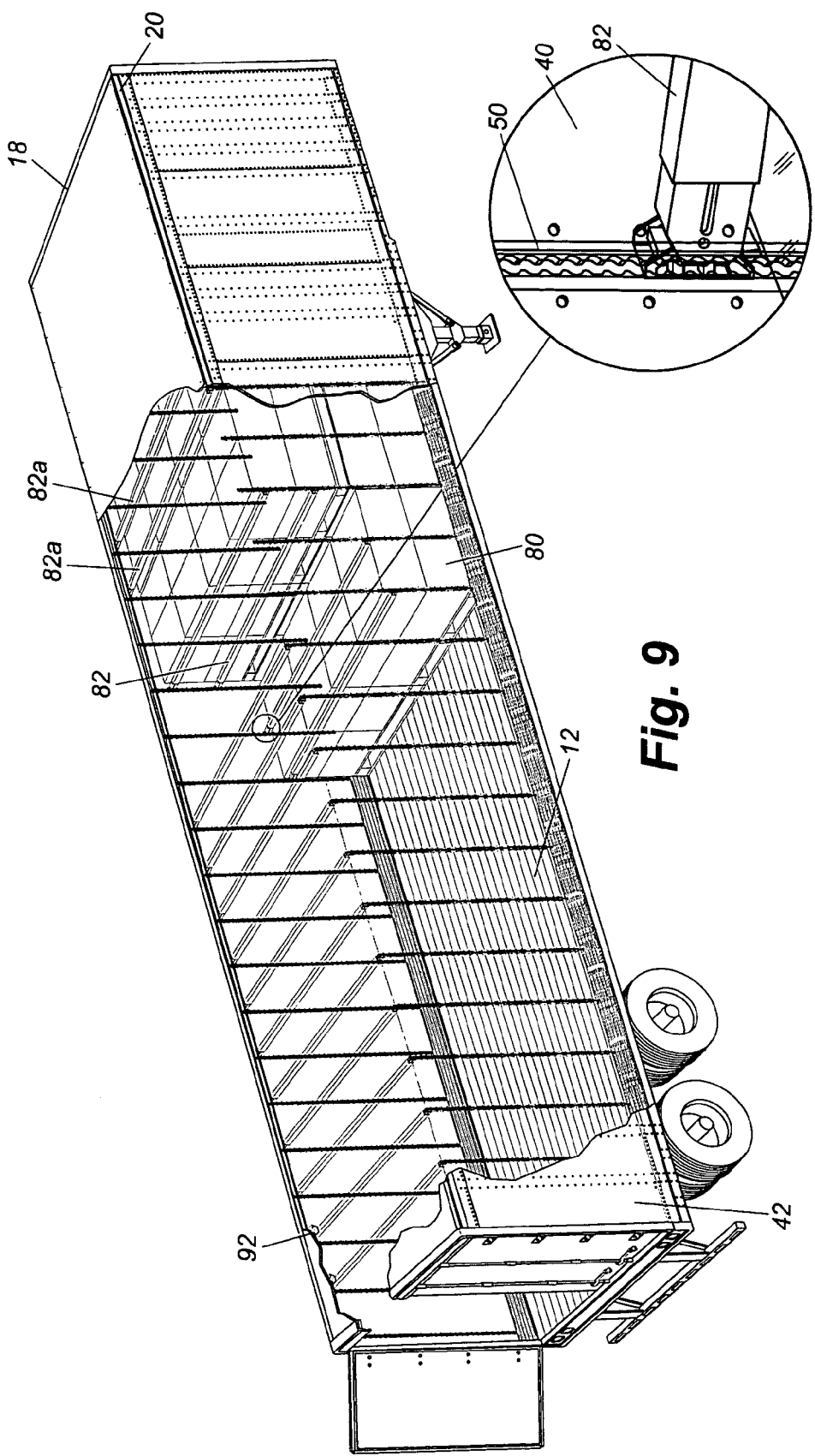
FIG. 9 is a partial perspective view of a cargo trailer in accordance with an embodiment of the present invention.
FIG. 9A is an enlarged inset view of a portion of the trailer shown in FIG. 9.

FIGS. 9 and 9A illustrate a cargo trailer in accordance with an embodiment of the present invention partially loaded with rectangular cargo crates 80 stacked between the sidewalls on trailer floor 12. The crates are retained in position by logistics bars 82 that extend between opposing logistics tracks 50. In the trailer's forward area, crates 80 extend nearly to roof 18, and the logistics bars 82a are therefore moved to the uppermost positions on logistics tracks 50, out of the way of cargo crates 80.

Figure 10:
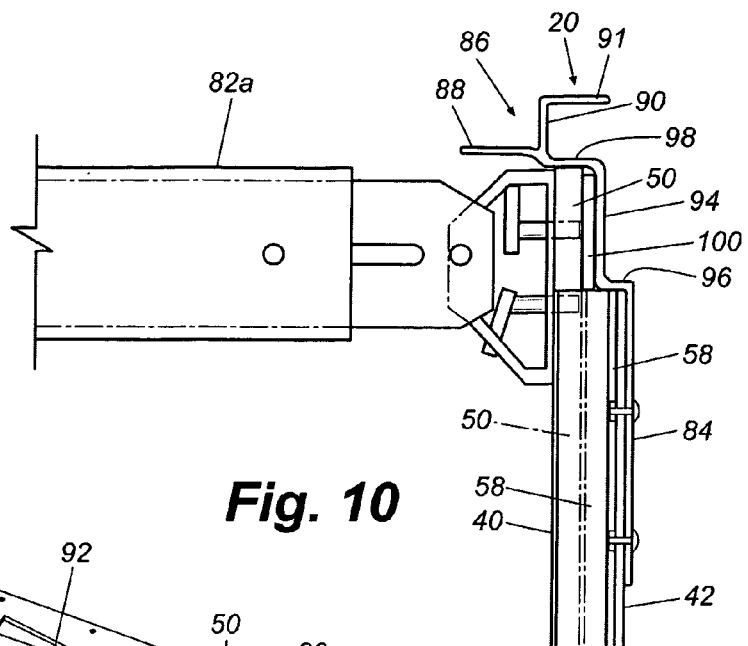
FIG. 10 is a partial side view of a roofbow, top rail, vertical post and logistics track in a trailer as in FIG. 9.
Figure 11:
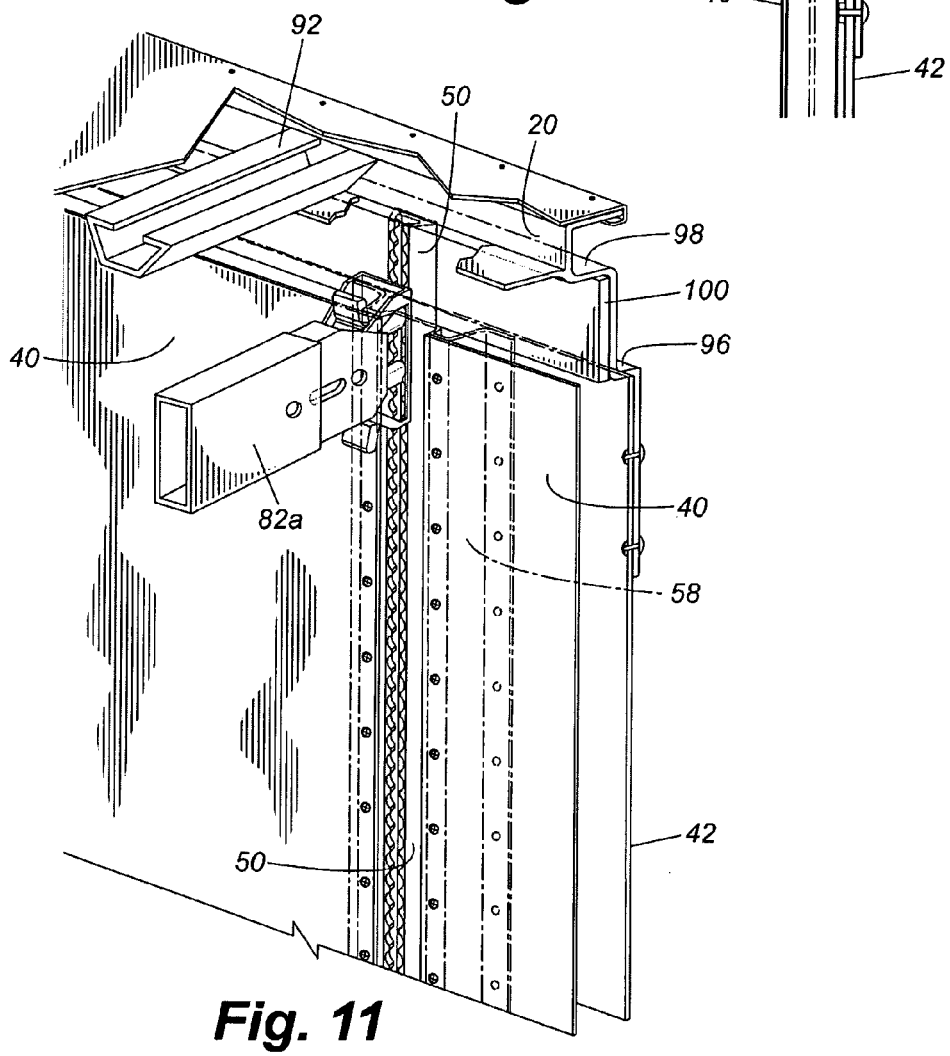
FIG. 11 is a partial perspective view of a trailer as in FIG. 9.

Referring also to FIGS. 10 and 11, top rail 20 on each sidewall maybe modified to facilitate movement of the logistics bars closer to the roof wall, thereby increasing the available space within the cargo area for rigid cargo. More specifically, each top rail 20 includes a vertical bottom flange 84 that defines the rail's bottom surface and that is attached by rivets to sidewall outer skin 42. At the top rail's top end, an attachment flange 86 defines the rail's top surface and includes a horizontal flange 88 and a vertical flange 90 that attach to roofbows 92, thereby securing top rail 20 to roof wall 18. A vertical connecting flange 94 extends between attachment flange 86 and bottom flange 84 and laterally faces the cargo area. Vertical flanges 90 and 94 extend between a top horizontal flange 91 and a lower horizontal connecting flange 96 to form an elongated channel that opens to the trailer's exterior.

In top rails used in prior art trailers, vertical connecting flange 94 was coplanar with vertical flange 90, such that lower horizontal connecting flange 96 extended across the front-to-back width of vertical post 58. An example of such a top rail is shown in FIG. 8, and this arrangement, as well as other suitable top rail constructions, may be used in a trailer as discussed herein. In the embodiment illustrated in FIGS. 9–11, however, vertical connecting flange 94 is shifted outward a distance equal to or greater than the front-to-back width of logistics tracks 50, thereby creating an upper horizontal attachment flange 98 extending between attachment flange 86 and vertical attachment flange 94. Thus, logistics track 50 may extend above vertical post 58, the top edges of inner wall panels 40 and lower horizontal attachment flange 96 so that the logistics track's top portion is proximate to attachment flange 86 (and, therefore, the roofbows), in this case abutting upper horizontal attachment flange 98. Logistics bars 82a can therefore be moved in the logistics tracks above the level of vertical post 58 to a position adjacent roofbows' 92. The ability to move the logistics bars closer to the roof when not in use increases the available cargo space within the cargo area without requiring removal of the logistics bars.

As noted above, the front-to-back-width of upper horizontal attachment flange 98 (i.e. the distance vertical attachment flange 94 is shifted from alignment with vertical flange 90) may be equal to or greater than the front-to-back width of logistics track 50. Where this distance is greater than the width of logistics track 50, however, an elongated shim 100 may be disposed along the inner surface of vertical attachment flange 94 so that the logistics tracks rests against the shim. In one preferred embodiment, each shim 100 is a 0.25 inch thick by 2.25 inch high extruded aluminum bar. Because the shim is disposed between the logistics tracks and the top rail and rests on the top of vertical posts 58, it is not necessary to otherwise attach the shim to the top rail. If desired, however, the shim may be attached to the top rail by adhesive, screws, rivets or other suitable means.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit thereof.

What is claimed:

1. A cargo body for transport by a cargo vehicle, said cargo body comprising:
   a floor; and
   two side walls extending upward from respective lateral sides of the floor so that a cargo area is defined between the side walls, each of the side walls further comprising
      an outer wall surface,
      a plurality of inner wall panels facing the cargo area, and
      a plurality of elongated vertical posts disposed between and attached to the outer wall surface and inner wall panels,
   wherein each elongated vertical post has a front surface facing the cargo area between adjacent said inner wall panels attached to the vertical post and has an elongated vertical trough recessed in the front surface and opening to the cargo area.

2. The cargo body of claim 1, wherein the vertical trough extends the entire vertical length of the vertical post.

3. The cargo body of claim 1, wherein the vertical trough is continuous along the trough's entire length.

4. The cargo body of claim 1, wherein each side wall further comprises a plurality of logistics devices, each logistics device being received within a said elongated vertical trough.

5. The cargo body of claim 1, wherein each side wall further comprises a plurality of logistics tracks, each logistics track being received within a respective said elongated vertical trough.

6. The cargo body of claim 5, wherein each logistics track is received within its respective elongated vertical trough so that a front surface of the logistics track facing the cargo area does not extend into the cargo area.

7. The cargo body of claim 6, wherein the front surface of each logistics track is substantially coplanar with surfaces of the inner wall panels facing the cargo area.

8. The cargo body of claim 7, wherein each elongated vertical post in each side wall has a portion proximate the floor that is recessed away from the cargo area and that receives a horizontal scuff band.

9. The cargo body of claim 5, wherein each logistics track has at least one attachment point located on the front surface of the logistics track.

10. The cargo body of claim 9, wherein the at least one attachment point does not substantially protrude into the cargo area.

11. A cargo body for transport by a cargo vehicle, said cargo body comprising:
    a floor; and
    two side walls extending upward from respective lateral sides of the floor so that a cargo area is defined between the side walls, each of the side walls further comprising
       an outer wall surface,
       a plurality of inner wall panels facing the cargo area,
       a plurality of elongated vertical posts disposed between and attached to the outer wall surface and inner wall panels, and
       a plurality of logistics tracks attached to respective elongated vertical posts,
    wherein each elongated vertical post has a front surface facing the cargo area between adjacent said inner wall panels attached to the vertical post and has an elongated vertical trough recessed in the front surface and opening to the cargo area, and
    wherein each logistics track is received within a respective said elongated vertical trough.

12. The cargo body of claim 11, wherein each logistics track is received in its respective elongated vertical trough so that a front surface of the logistics track facing the cargo area does not extend into the cargo area.

13. The cargo body of claim 12, wherein the front surface of each logistics track is substantially coplanar with surfaces of the inner wall panels facing the cargo area.

14. The cargo vehicle of claim 12, wherein each elongated vertical post in each side wall has a portion proximate the floor that is recessed away from the cargo area and that receives a horizontal scuff band.

15. A cargo vehicle, said vehicle comprising:
    a plurality of wheels;
    a floor supported by the wheels; and
    two side walls extending upward from respective lateral sides of the floor so that a cargo area is defined between the side walls, each of the side walls further comprising
    an outer wall surface,
    a plurality of inner wall panels facing the cargo area, and
    a plurality of elongated vertical posts disposed between and attached to the outer wall surface and inner wall panels,
    wherein each elongated vertical post has a front surface facing the cargo area between adjacent said inner wall panels attached to the vertical post and has an elongated vertical trough recessed in the front surface and opening to the cargo area.

16. The cargo vehicle of claim 15, wherein each side wall further comprises a plurality of logistics devices, each logistics device being received within a said elongated vertical trough.

17. The cargo vehicle of claim 15 wherein each side wall further comprises a plurality of logistics tracks, each logistics track being received within a respective said elongated vertical trough.

18. The cargo vehicle of claim 17 wherein each logistics track is received in its respective elongated vertical trough so that a front surface of the logistics track facing the cargo area does not extend into the cargo area.

19. The cargo vehicle of claim 18, wherein the front surface of each logistics track is substantially coplanar with surfaces of the inner wall panels facing the cargo area.

20. The cargo vehicle of claim 19, wherein each elongated vertical post in each side wall has a portion proximate the floor that is recessed away from the cargo area and that receives a horizontal scuff band.

21. The cargo vehicle of claim 19, wherein each logistics track has at least one attachment point located on the front surface of the logistics track.

22. The cargo vehicle of claim 21, wherein the at least one attachment point does not substantially protrude into the cargo area.

23. A cargo vehicle, said vehicle comprising:
a plurality of wheels;
a floor supported by the wheels; and
two side walls extending upward from respective lateral sides of the floor so that a cargo area is defined between the side walls, each of the side walls further comprising an outer wall surface,
a plurality of inner wall panels facing the cargo area,
a plurality of elongated vertical posts disposed between and attached to the outer wall surface and inner wall panels, and
a plurality of logistics tracks attached to respective elongated vertical posts,
wherein each elongated vertical post has a front surface facing the cargo area between adjacent said inner wall panels attached to the vertical post and has an elongated vertical trough recessed in the front surface and opening to the cargo area, and
wherein each logistics track is received within respective said elongated vertical troughs.

24. The cargo vehicle of claim 23, wherein a front surface of each logistics track facing the cargo area is substantially coplanar with surfaces of the inner wall panels facing the cargo area.

25. The cargo vehicle of claim 24, wherein each elongated vertical post in each side wall has a portion proximate the floor that is recessed away from the cargo area and that receives a horizontal scuff band.

26. A cargo body for transport by a cargo vehicle, said cargo body comprising:
a floor; and
two side walls extending upward from respective lateral sides of the floor so that a cargo area is defined between the side walls, each of the side walls further comprising an outer wall surface,
a plurality of inner wall panels facing the cargo area, and
a plurality of elongated vertical posts disposed between and attached to the outer wall surface and inner wall panels, and
wherein each elongated vertical post has at least two areas for attachment to the inner wall panels, an area for attachment to the outer wall surface, and an elongated vertical trough facing the cargo area, the elongated vertical trough formed between the areas for attachment to the inner wall panels.

27. The cargo body of claim 26, wherein each side wall further comprises a plurality of logistics devices, each logistics device being received within a respective said vertical trough.

28. The cargo body of claim 27, wherein a front surface of each logistics device facing the cargo area is substantially coplanar with surfaces of the inner wall panels facing the cargo area.

29. The cargo body of claim 28, wherein each elongated vertical post in each side wall has a portion proximate the floor that is recessed away from the cargo area and that receives a horizontal scuff band.

30. A cargo body for transport by a cargo vehicle, said cargo body comprising:
a floor;
two side walls extending upward from respective lateral sides of the floor; and
a roof wall extending between the side walls and opposing the floor so that a cargo area is bounded by the floor, the side walls and the roof wall,
wherein at least one of the side walls and the roof wall further comprises
an outer wall surface,
a plurality of inner wall panels facing the cargo area, and
a plurality of elongated posts disposed between and attached to the outer wall surface and the inner wall panels, and
wherein each elongated post has a front surface facing the cargo area between adjacent said inner wall panels attached to the post and has an elongated trough extending lengthwise along, and recessed in, the front surface and opening to the cargo area.

31. The cargo body of claim 30, wherein the elongated trough extends the entire length of the post.

32. The cargo body of claim 30, wherein the elongated trough is continuous along the trough's entire length.

33. The cargo body of claim 30, wherein said at least one of the side walls and the roof wall comprises the roof wall.

34. The cargo body of claim 33, wherein the roof wall further comprises a plurality of logistics tracks, each logistics track being received within a respective said elongated trough.

35. A method of increasing volume of a cargo area within a cargo body for transport by a cargo vehicle, where the cargo body includes a longitudinal member disposed on a wall facing the cargo area, said method including the steps of:
providing a floor;
providing two side walls extending upward from respective lateral sides of the floor; and
providing a roof wall extending between the side walls and opposing the floor so that the cargo area is bounded by the floor, the side walls and the roof wall,
wherein at least one of the side walls and the roof wall further comprises
an outer wall surface,
a plurality of inner wall panels facing the cargo area, and
a plurality of elongated posts disposed between and attached to the outer wall surface and the inner wall panels, wherein each elongated post has a front surface facing the cargo area between adjacent said inner wall panels attached to the post;

in at least one said post, defining an elongated trough extending lengthwise along, and recessed in, the front surface and opening to the cargo area; and disposing the longitudinal member in the elongated trough.

36. The method as in claim 35, wherein the longitudinal member is a logistics track.

37. The method as in claim 35, including defining a said elongated trough in each said post.

38. The method as in claim 37, wherein the roof wall comprises the outer wall surface, the plurality of inner wall panels, and the plurality of elongated posts.

39. The method as in claim 37, wherein each of the side walls comprises a respective said outer wall surface, a respective said plurality of inner wall panels, and a respective said plurality of elongated posts.

40. A cargo body for transport by a cargo vehicle, said cargo body comprising:

a floor; and two side walls extending upward from respective lateral sides of the floor so that a cargo area is defined between the side walls, each of the side walls further comprising an elongated top rail extending along a top of the side wall and defining a bottom surface, an outer wall surface extending between the top rail and the bottom rail and facing an exterior of the cargo body, an inner wall surface extending between the top rail and the bottom rail and facing the cargo area, and a plurality of logistics tracks, wherein the top rail includes a lower horizontal flange disposed above the top rail bottom surface, an upper horizontal flange disposed above the lower horizontal flange and a vertical flange extending between the upper horizontal flange and the lower horizontal flange to define an elongated concave channel opening to the exterior of the cargo body, wherein the top rail vertical flange defines a vertical inner surface facing laterally toward the cargo area, and wherein each logistics track extends vertically along the inner wall surface below the top rail bottom surface and has a top portion that extends above the top rail bottom surface and the top rail lower horizontal flange and inward of the top rail vertical flange inner surface.

41. The cargo body of claim 40, wherein each of the outer wall surface and the inner wall surface defines a top edge, and wherein the outer wall surface top edge and the inner wall surface top edge are below the top rail lower horizontal flange.

42. The cargo body of claim 40, wherein the top rail vertical flange has an upper portion and has a lower portion parallel to and laterally offset from the top rail vertical flange upper portion, and wherein a middle horizontal flange connects the top rail vertical flange upper portion and the top rail vertical flange lower portion.

43. The cargo body as in claim 42, wherein a top of the logistics track extends above the top rail lower horizontal flange to a position proximate the top rail middle horizontal flange.

44. A cargo body for transport by a cargo vehicle, said cargo body comprising:

a floor; and two side walls extending upward from respective lateral sides of the floor so that a cargo area is defined between the side walls, each of the side walls further comprising an elongated top rail extending along a top of the side wall, wherein the top rail has a top surface, a bottom surface and an inner surface, and wherein the top rail inner surface faces laterally toward the cargo area, an elongated bottom rail extending along a bottom of the side wall, an outer wall surface extending between the top rail and the bottom rail and facing an exterior of the cargo body, an inner wall surface extending between the top rail and the bottom rail and facing the cargo area, wherein the inner wall surface defines a top edge, and a plurality of logistics tracks, wherein each logistics track extends vertically along the inner wall surface below the top rail bottom surface and has a top portion that extends above the top rail bottom surface and the inner wall surface top edge and inward of the top rail inner surface.

45. The cargo body of claim 44, further comprising a roof wall having a top outer surface extending between the side walls and attached to the top rails thereof and a plurality of parallel, horizontal roofbows extending between the top rails and beneath the top outer surface, wherein the top portion of each of the logistics tracks extends above the inner wall surface top edge to a position proximate the roofbows, thereby permitting the securing of restraint devices to the logistics tracks proximate the roofbows.

46. A cargo body for transport by a cargo vehicle, said cargo body comprising:

a floor; and two side walls extending upward from respective lateral sides of the floor so that a cargo area is defined between the side walls, each of the side walls further comprising an elongated top rail extending along a top of the side wall, wherein the top rail includes a horizontal flange and a vertical flange extending upward from the horizontal flange, an elongated bottom rail extending along a bottom of the side wall, an outer wall surface extending between the top rail and the bottom rail and facing an exterior of the cargo body, a plurality of inner wall panels extending between the top rail and the bottom rail and facing the cargo area, wherein each inner wall panel defines a top edge proximate the top rail horizontal flange, and a plurality of elongated vertical posts disposed between and attached to the outer wall surface and the inner wall panels; and a roof wall having a top outer surface extending between the side walls and attached to the top rails thereof and a plurality of parallel, horizontal roofbows extending between the top rails and beneath the top outer surface, wherein each side wall includes a plurality of logistics tracks, each logistics track extending vertically along and attached to a respective vertical post and having a top portion that extends above the top rail horizontal flange and the top edges of the inner wall panels inward of the top rail vertical flange.

47. The cargo body of claim 46, wherein the top portion of each of the logistics tracks extends to a position proximate the roofbows.

48. A cargo body for transport by a cargo vehicle, said cargo body comprising:

a floor;

two side walls extending upward from respective lateral sides of the floor, each of the side walls defining an inner surface and an outer surface, the side wall inner surfaces defining a cargo area therebetween, each of the side walls further comprising an elongated bottom rail extending along a bottom of the side wall and connecting the floor to the side wall, and an elongated top rail extending along a top of the side wall; and a roof extending between the respective top rails of the two side walls, the roof comprising a plurality of elongated roofbows, the roolbows each being supported at ends thereof by the top rails;

wherein each of the side walls includes a plurality of elongated logistics tracks extending vertically along the inner surface of the side wall, and wherein at least one of the logistics tracks extends beyond a bottom edge of the top rail of the side wall and terminates at a position on said top rail proximate to a position on said top rail at which the roofbows attach.

49. The cargo body as in claim 48, wherein each logistics track at each side wall extends beyond the bottom edge of the top rail of the side wall and terminates at the position on said side wall at which the roofbows attach.

* * * * *